United States Patent [19]

Barber et al.

[11] Patent Number: 5,579,471
[45] Date of Patent: Nov. 26, 1996

[54] IMAGE QUERY SYSTEM AND METHOD

[75] Inventors: Ronald J. Barber, San Jose; Bradley J. Beitel, Woodside; William R. Equitz, Palo Alto; Carlton W. Niblack, San Jose; Dragutin Petkovic, Saratoga; Thomas R. Work, San Francisco; Peter C. Yanker, Mountain View, all of Calif.

[73] Assignee: International Business Machines Corporation, Armonk, N.Y.

[21] Appl. No.: 216,986

[22] Filed: Mar. 23, 1994

Related U.S. Application Data

[63] Continuation-in-part of Ser. No. 973,474, Nov. 9, 1992, abandoned.

[51] Int. Cl.$^6$ .............................. G06F 17/30; G06F 3/14
[52] U.S. Cl. .......................... 395/326; 395/606; 395/348; 382/209; 382/220; 382/305
[58] Field of Search ................................... 395/161, 159, 395/157, 155, 156, 600; 382/220, 218, 209, 306, 305, 165, 203

[56] References Cited

U.S. PATENT DOCUMENTS

| | | | |
|---|---|---|---|
| 4,646,250 | 2/1987 | Childress | 395/149 |
| 4,672,683 | 6/1987 | Matsueda | 382/305 |
| 4,716,404 | 12/1987 | Tabata et al. | 395/164 X |
| 4,829,453 | 5/1989 | Katsuta et al. | 382/305 |
| 4,944,023 | 7/1990 | Imao et al. | 382/240 |
| 5,012,334 | 4/1991 | Etra | 348/107 |
| 5,148,522 | 9/1992 | Okazaki | 395/161 |
| 5,179,652 | 1/1993 | Rozmanith et al. | 395/155 |
| 5,202,828 | 4/1993 | Vertelney et al. | 395/159 X |
| 5,220,648 | 6/1993 | Sato | 395/155 X |
| 5,381,158 | 1/1995 | Takahara et al. | 395/161 X |
| 5,421,008 | 5/1995 | Banning et al. | 395/600 |
| 5,428,727 | 6/1995 | Kurosu et al. | 395/155 X |
| 5,434,966 | 7/1995 | Nakazawa et al. | 395/161 |

OTHER PUBLICATIONS

Gupta, Amarnath; Weymount, Terry & Jain, Ramesh, "Semantic Queries With Pictures: The VIMSYS Model", Proceedings of the 17th International Conference on Very Large Data Bases, pp. 69–79, Barcelona, Sep., 1991.

A. Yamamoto et al., "Extraction of Object Features and Its Application to Image Retrieval", Trans. of IEICE, vol. E72, No. 6, 771–781 (Jun. 1989).

E. Binaghi et al., "A Knowledge–Based Environment for Assessment of Color Similarity", Proc. 2nd Annual Conference on Topics for A1, pp. 268–285 (1990).

A. Yamamoto et al., "Extraction of Object Features from Image and Its Application to Image Retrieval", Proc. 9th Annual Conference on Pattern Recognition, vol. II, pp. 988–991 (Nov. 1988).

N. S. Chang et al., "Query–by–Pictorial Example", IEEE Transactions on Software Engineering, vol. SE–6, No. 6, pp. 519–524 (Nov. 1980).

J. M. Chassery, et al., "An Interactive Segmentation Method Based on Contextual Color and Shape Criterion", IEEE Transactions on Pattern Analysis and Machine Intelligence, vol. PAMI–6, No. 6, (Nov. 1984).

N. S. Chang, et al., "Picture Query Languages for Pictorial Data–Base Systems", Computer vol. 14, No. 11, pp. 23–33 (Nov. 1981).

(List continued on next page.)

Primary Examiner—Raymond J. Bayerl
Attorney, Agent, or Firm—Baker, Maxham, Jester & Meador

[57] ABSTRACT

Images in an image database are searched in response to queries which include the visual characteristics of the images such as colors, textures, shapes, and sizes, as well as by textual tags appended to the images. Queries are constructed in an image query construction area in response to values of representations of the visual characteristics and to locations of the representations in the image query construction area.

35 Claims, 13 Drawing Sheets

OTHER PUBLICATIONS

H. Tamura, et al., "Textural Features Corresponding to Visual Perception, " IEEE Transactions on System, Man, and Cyb., vol. SMC-8, No. 6, pp. 460–473 (1978).

R. Price, et al., "Applying Relevance Feedback to a Photo Archival System", Journal of Information Science 18, pp. 203–215 (1992).

Y. Okada, et al., "An Image Storage and Retrieval System for Textile Pattern Adaptable to Color Sensation of the Individual", Trans. Inst. Elec. Inf. Comm., vol. J70D, No. 12, pp. 2563–2574, Dec. 1987 (Japanese w/English Abstract).

S. Negahdaripour et al "Challenges in Computer Vision: Future Research Direction", IEEE Transactions On Systems, Man And Cybernetics, pp. 189–199, 1992, at Conference on Computer Vision and Pattern Recognition.

Data Partner 1.0 Simplifies DB Query Routines, PC Week, Sep. 14, 1992, pp. 55 & 58.

Training Computers To Note Images, New York Times, Apr. 15, 1992.

W. Niblack et al, "Find me the Pictures that Look Like This: IBM'S Image Query Project", Advanced Imaging, Apr. 1993, pp. 32–35.

Z. Chen et al, "Computer Vision for Robust 3D Aircraft Recognition with Fast Library Search", Pattern Recognition, vol. 24, No. 5, pp. 375–390, 1991, printed in Great Britain.

S. Chang et al, "Iconic Indexing by 2-D Strings", IEEE Transactions On Pattern Analysis And Machine Intelligence, vol. PAMI-9, No. 3, May 1987.

T. Arndt, "A Survey of Recent Research in Image Database Management", IEEE Publication No. TH0330–1/90/0000/0092, pp. 92–97, 1990.

A. D. Bimbo, et al, "3-D Visual Query Language for Image Databases", Journal Of Visual Languages & Computing, 1992, pp. 257–271.

E. Binaghi et al, "Indexing and Fuzzy Logic Based Retrieval of Color Images", Visual Database Systems, II, 1992, pp. 79–92.

C. Chang et al, "Retrieval of Similar Pictures on Pictorial Databases", Pattern Recognition, vol. 24, No. 7, 1991, pp. 675–680.

A. E. Cawkell, "Current Activities in Image Processing Part III: Indexing Image Collections", CRITique, vol. 4, No. 8, May 1992, pp. 1–11, ALSIB, London.

C. Chang, "Retrieving the Most Similar Symbolic Pictures from Pictorial Databases", Information Processing & Management, vol. 28, No. 5, 1992.

S. Chang et al, "Iconic Indexing by 2-D Strings", IEEE Transactions On Pattern Analysis And Machine Intelligence, vol. 9, No. 3, May 1987, pp. 413–427.

S. Chang et al, "An Intelligent Image Database System", IEEE Transactions On Software Engineering, vol. 14, No. 5, May 1988, pp. 681–688.

S. Charles et al, "Using Depictive Queries to Search Pictorial Databases", Human Computer Interaction, 1990, pp. 493–498.

T. Gevers et al, "Indexing of Images by Pictorial Information", Visual Database Systems, II, 1992 IFIP, pp. 93–101.

T. Gevers et al, "Enigma: An Image Retrieval System", IEEE 11th IAPR International Conference On Pattern Recognition, 1992, pp. 697–700.

C. Goble et al, "The Manchester Multimedia Information System", Proceedings of IEEE Conference, Eurographics Workshop, Apr., 1991, pp. 244–268.

W. Grosky et al, "Index-based Object Recognition in Pictorial Data Management", Computer Vision, 1990, pp. 416–436.

W. Grosky et al, "A Pictorial Index Mechanism for Model-based Matching", Data 7 Knowledge Engineering 8, 1992, pp. 309–327.

V. Gudivada et al, "A Spatial Similarity Measure for Image Database Applications", Technical Report 91–1, Department of Computer Science, Jackson, Mississippi, 39217, 1990–1991.

J. Hasegawa et al, "Intelligent Retrieval of Chest X-Ray Image Database Using Sketches", System And Computers In Japan, 1989, pp. 29–42.

K. Hirata et al, "Query by Visual Example Content Based Image Retrieval", Advances In Database Technology, Mar., 1992, pp. 57–71.

M. Ioka, "A Method of Defining the Similarity of Images on the Basis of Color Information", Bulletin Of The National Museum Of Ethnology Special Issue, pp. 229–244, No. 17, Nov. 1992.

T. Kato, "A Sketch Retrieval Method for Full Color Image Database—Query by Visual Example", IEEE, Publication No. 0-8186-2910-X/92, 1992, pp. 530–533.

T. Kato, "Intelligent Visual Interaction with Image Database Systems Toward the Multimedia Personal Interface", Journal Of Information Processing, vol. 14, No. 2, 1991, pp. 134–143.

T. Kato et al, "A Cognitive Approach Interaction", International Conference Of Multimedia Information Systems, Jan., 1991, pp. 109–119.

T. Kato et al, "Trademark: Multimedia Database with Abstracted Representation on Knowledge Base", Proceedings Of The Second International Symposium On Interoperable Information Systems, pp. 245–252, Nov. 1988.

T. Kato et al, "Trademark: Multimedia Image Database System with Intelligent Human Interface", System And Computers In Japan, 1990, pp. 33–46.

M. Kurokawa, "An Approach to Retrieving Images by Using their Pictorial Features", IBM Research, Japan, Sep. 1989.

E. Lee, "Similarity Retrieval Techniques", Pictorial Information Systems, Springer Verlag, 1980 pp. 128–176.

S. Lee et al, "Spatial Reasoning and Similarity Retrieval of Images Using 2D C-string Knowledge Representation", Pattern Recognition, 1992, pp. 305–318.

S. Lee et al, "Similarity Retrieval of Iconic Image Database", Pattern Recognition, vol. 22, No. 6 1989, pp. 675–682.

S. Lee et al, "2D C-string: A New Spatial Knowledge Representation for Image Database Systems", Pattern Recognition, vol. 23, 1990, pp. 1077–1087.

R. Mehrotra et al, "Shape Matching Utilizing Indexed Hypotheses Generation and Testing", IEEE Transactions On Robotics, vol. 5, No. 1, Feb. 1989, pp. 70–77.

M. H. O'Docherty et al, "Multimedia Information System —The Management and Semantic Retrieval of all Electronic Data Types", The Computer Journal, vol. 34, No. 3, 1991.

A. Pizano et al, "Communicating with Pictorial Databases", Human-Machine Interactive Systems, pp. 61–87, Computer Science Dept, UCLA, 1991.

P. Stanchev et al, "An Approach to Image Indexing of Documents", Visual Database Systems, II, 1992, pp. 63–77.

M. Swain et al, "Color Indexing", International Journal Of Computer Vision, 1991, pp. 12–32.

H. Tamura et al, "Image Database Systems: A Survey", Pattern Recognition, vol. 17, No. 1, 1984, pp. 29–34.

S. Tanaka et al, "Retrieval Method for an Image Database based on Topological Structure", SPIE, vol. 1153, 1989, pp. 318–327.

G. Tortora et al, "Pyramidal Algorithms", Computer Vision, Graphics and Images Processing, 1990, pp. 26–56.

K. Wakimoto et al, "An Intelligent User Interface to an Image Database using a Figure interpretation Method", IEEE Publication No. CH2898-5/90/0000/0516, 1990, pp. 516–520.

K. Woolsey, "Multimedia Scouting", IEEE Computer Graphics And Applications, Jul. 1991 pp. 26–38.

A. Yamamoto et al, "Extraction of Object Features from Image and its Application to Image Retrieval", IEEE 9th International Conference On Pattern Recognition, 1988, 988–991.

A. Yamamoto et al, "Image Retrieval System Based on Object Features", IEEE Publication No. CH2518-9/87/0000-0132, 1987, pp. 132–134.

Y. Yoshida et al, "Description of Weather Maps and Its Application to Implementation of Weather Map Database", IEEE 7th International Conference On Pattern Recognition, 1984, pp. 730–733.

X. Zhang, et al, "Design of a Relational Image Database Management System: IMDAT", IEEE Publication No. TH0166-9/87/0000-0310, 1987, pp. 310–314.

| THUMBNAIL (COLOR) | AVG RED | AVG GREEN | AVG BLUE |
|---|---|---|---|
| M | $R_m$ | $G_m$ | $B_m$ |
| ⋮ | | | |

60

| THUMBNAIL (TEXTURE) | COARSENESS | CONTRAST | DIRECTIONALITY |
|---|---|---|---|
| P (smooth) | $C_p$ | $CN_p$ | $I_p$ |
| ⋮ | | | |

62

| THUMBNAIL (SIZE) | SIZE |
|---|---|
| Q | PIXELS$^2$ |
| ⋮ | |

64

| THUMBNAIL (SHAPE) | POLYGON |
|---|---|
| S | "parm$_1$, parm$_2$,..." |
| ⋮ | |

66

| THUMBNAIL (CATEGORY) |
|---|
| SPIRE |
| ⋮ |

IMAGE QUERY SYSTEM AND METHOD

CROSS-REFERENCES TO RELATED APPLICATIONS

This application is a continuation-in-part of U.S. patent application Ser. No. 07/973,474, filed Nov. 9, 1992, for "IMAGE QUERY SYSTEM AND METHOD", B. Beitel et al, now abandoned.

BACKGROUND OF THE INVENTION

1. Field of the Invention

This invention relates to computer-based system which provides access to an image database by use of queries based on image characteristics.

2. Discussion of the Related Art

Relational databases which use queries to request retrieval of database information are well known. A query is a language-based request for information from a database based upon specific conditions. For example, a query may request a list of all bank customers whose account balances exceed a certain value.

A recent advance has freed the query function from language-based user operations. Tools are available in menu-driven dialog interfaces which enable a user to construct queries by manipulating icons in a dialog box on a display screen. The icons are arranged to symbolize database search requests.

To date, database systems which store images have not provided an efficient means of searching a database by other than textual attributes of the images. However, this requires the expenditure of significant resources to annotate images with text. Furthermore, limiting queries to textual annotations forgoes the possibility of searching an image database by using pixel information from the actual images which are stored in the database.

Much work has been expended to enable digital computers to recognize images by features which they contain. Some success has been achieved in having digital computers identify objects in images. H. Tamura, et al. have reported an advance in computational detection of image textures in their article entitled "Textural Features Corresponding to Visual Perception", *IEEE Proceedings,* Vol. SMC-8, No. 6, June 1978, pp. 460–473.

Similarly, for characterizing shape, various computational methods have been proposed. An example is the algebraic moment invariants of G. Taubin and D. B. Cooper "Recognition and Positioning of Rigid Objects Using Algebraic Moment Invariants", Geometric Methods in Computer Vision, SPIE Vol. 1570, pp. 175–186, 1992.

Several methods have been reported for querying computer image databases based on the colors and textures that occur in the images. The most common basis is color. Two cases occur. The first is when colors are selected by a user from a color wheel or other color picker, and images containing the selected colors are retrieved. An example of this is given in E. Binaghi, et al, "Indexing and Fuzzy Logic-Based Retrieval of Color Images", *Visual Database Systems, II, IFIP Transactions A-7,* pages 79–92, Elsevier Science Publishers, 1992, in which not only color but also percentage coverage of that color and compactness of its coverage are used as query conditions.

The second case is when a color image is specified, and similar images are to be retrieved. A method for doing this is described in M. J. Swain, et al, "Color Indexing", *International Journal of Computer Vision,* 7(1):11–32, 1991. The method uses "histogram intersection", in which a color histogram is computed for each image in the database, and a corresponding color histogram is computed for the query image. These histograms are computed over a quantized version of the available color space, giving, for example, 256 bins in the color histogram. A measure of similarity is defined for two histograms, and a query is run by computing the similarity between the query image histogram and the histogram of each image in the database.

A more sophisticated method for retrieving images similar to a given image is given in Mikihiro Ioka, "A Method of Defining the Similarity of Images on the Basis of Color Information", *Technical Report RT*-0030, IBM Tokyo Research Lab, 1989. Here, each image in the database (actually, the subimage of each image containing a single, dominant object in the image) is partitioned into blocks, for example, 25 blocks. Within each block, the reduced bucket histogram,h, (say, 256 buckets) is computed. Given a query image or object, it is also partitioned into the same number of blocks and the histograms computed. A similarity measure $s(h_{query\_image}, h_{database\_item})$ is defined on the color histograms computed in the blocks, and the measure is extended to images as:

$$S(query\_image, database\_image) = \Sigma_{blocks}\ s(h_{query\_item}, h_{database\_item})$$

This method thus takes into account the distribution of colors in two images, as well as their spatial position, since the colors must not only match, but match at exactly the same positions to give a good matching score.

SUMMARY OF THE INVENTION

The general problem solved by this invention is that of retrieving images from an on-line image database. Standard methods use image identifiers and/or text or keywords associated with each image. Other approaches, such as those described in the prior art, use the colors that appear in the images.

Often a user remembers several objects in an image, including their approximate color and position, or the user may simply request "blue at the top, white at the bottom" in an attempt to retrieve a beach scene with sky at the top and sand at the bottom. This invention specifically invests a user with the ability to automatically retrieve an image from a large collection of images by approximately specifying the colors or other image characteristics of areas that occur in the image and the approximate positions at which they occur. The features for only a few areas in the scene need to be specified, these features need only be specified approximately, and their position in the scene need only be specified approximately. As compared to the Ioka method in the prior art, which requires a complete and spatially exact query specification, and was designed for image-to-image matching, the present invention supports a user-composed query for image matching, requires characteristics in only a few areas to be specified, requires their position to be only approximately specified so they can be somewhat misspositioned, and is economical in terms of storage and computation.

The invention is embodied in a query facility which builds a visual query by image content. An image query area is displayed on a display surface. One or more image characteristic selection areas are displayed which afford a user a means to select image characteristics. An image query is constructed by moving selected image characteristic representations from a selection area to the image query area. A query engine generates an image query in response to the types and positions of selected image characteristic representations in the image query area. Query responses include database images with features that correspond to the selected image characteristic representations in the image query area.

In a first embodiment, an image query window is presented, together with one or more image characteristic windows. Each image characteristic window represents a particular predefined image characteristic and includes a set of one or more thumbnails (icons) corresponding to various values of the image characteristic represented by the characteristic window. The thumbnails represent important aspects of the image being sought, such as color, texture, shape and area. Thumbnails representing image characteristics may be dragged to the image query window where they may be arranged into a desired spatial orientation which corresponds to the positioning of image features. The image query window therefore may enclose a set of thumbnails having layout and spatial characteristics selected and arranged by a user into an example scene.

In the first embodiment, a computer display interface for constructing an image query used to access images in a database based on image content includes a first selection window for specifying image color and including a plurality of color thumbnails, a second selection window for specifying image shapes and including a plurality of shape thumbnails, a third selection window for specifying image textures and including a plurality of texture thumbnails, and a fourth selection window including a plurality of category thumbnails which may denote keywords, text, or conditions on alpha-numeric data associated with an image. The interface further includes an image query construction window for composing an image query from the thumbnails by dragging thumbnails from image characteristic windows and dropping them at selected positions on the image query construction window.

In a system including a computer display and cursor control means for moving symbols on the display, the first embodiment embraces a method for constructing an image query used to access images in a database based on image content. The method includes the steps of displaying at least one selection window on the computer display which includes a plurality of sample image characteristic identifiers (thumbnails), displaying an image query construction window on the display and moving at least one sample image characteristic identifier from the selection container into the image query construction window to denote an image content characteristic.

In a second embodiment of the invention, the image characteristic selection area includes at least a color palette or wheel. A cursor-based mechanism enables a user to point at a color in the selection area, to select the color by clicking, and to draw or paint with the selected color in the image query area.

It is therefore an object of this invention to enable searching an image database by queries based on pixel information from the stored images.

Another object of the invention is to provide a query-based technique for locating an image in an image database by using characteristics of the image in addition to text annotation.

A still further object is to provide, in a query-by-image-content system, a visual direct-manipulation interface for the construction of database queries based on image content.

BRIEF DESCRIPTION OF THE DRAWINGS

The objectives set forth above and other distinct advantages of the invention will be manifest when the following detailed description is read in conjunction with the below-described drawings, in which FIGS. 3–10B illustrate a first embodiment of the invention, FIGS. 11A–14 illustrate a second embodiment of the invention, and:

FIG. 3 illustrates thumbnail definition tables which are used to construct an image query according to the invention;

FIG. 4 illustrates construction of an image query using an image query construction window;

FIG. 5 illustrates the organization of a display screen when the invention operates according to a first embodiment in the industrial embodiment illustrated in FIG. 1;

FIG. 6 illustrates a representative result of an image query shown in FIG. 5;

FIG. 7 illustrates a context dialogue box displayed in the operation of the invention;

FIG. 9 illustrates a results window displayed in response to an image query;

FIGS. 10A and 10B comprise a flow chart that illustrates a method of image query construction according to the invention;

FIGS. 11A and 11B illustrate spatial partitioning of an image according to a second embodiment of the invention;

FIG. 12 illustrates the organization of a display screen with a block positional picker when the invention operates according to the second embodiment in an industrial environment corresponding to that illustrated in FIG. 1;

FIG. 13 illustrates a second embodiment display screen with a freehand positional picker; and FIG. 14 illustrates a display screen showing results of the query represented in FIG. 12.

DETAILED DESCRIPTION OF THE PREFERRED EMBODIMENTS

SYSTEM CONTEXT

Figure 1:
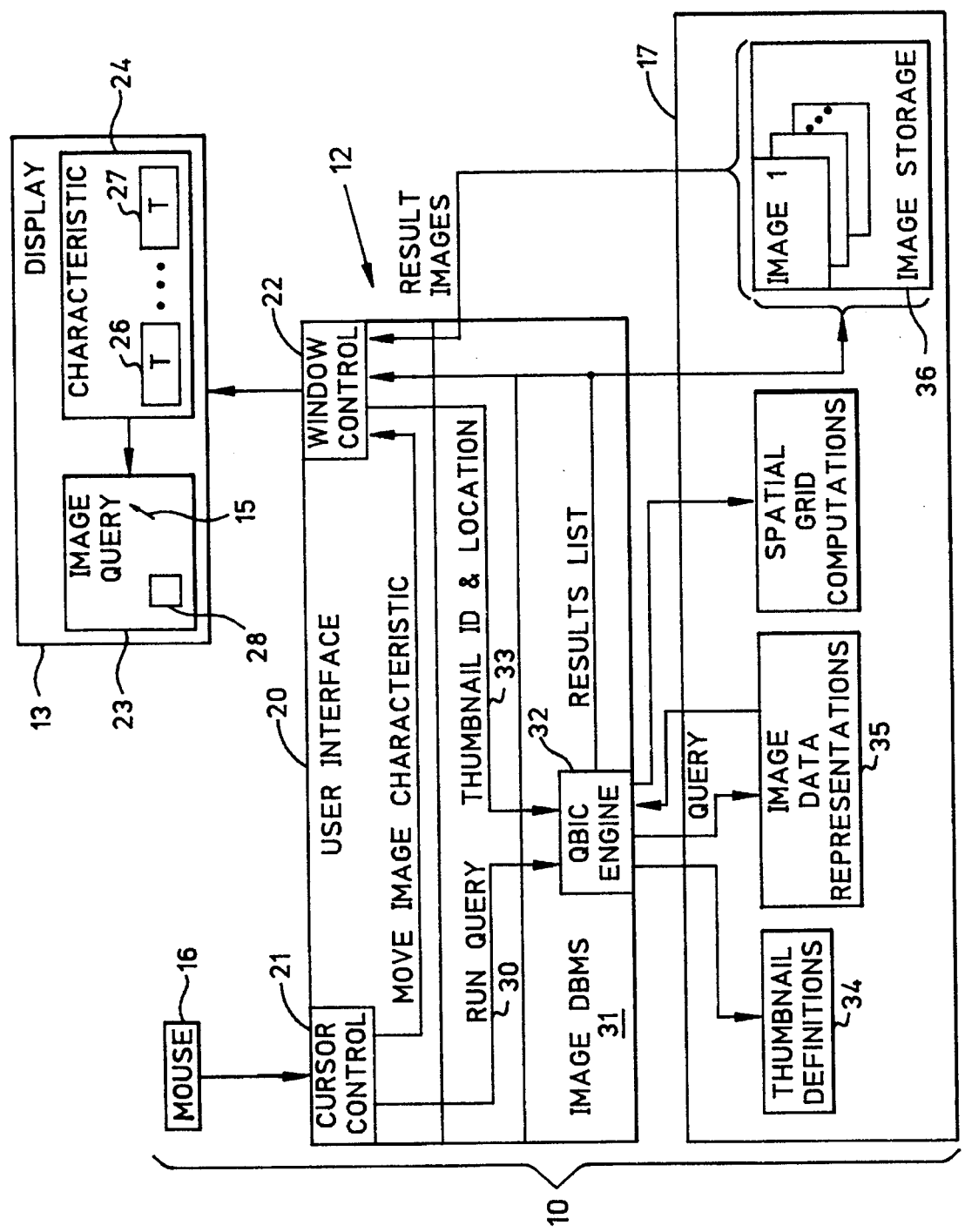
FIG. 1 is a block diagram of the industrial environment in which the invention is practiced.

It will be understood and appreciated by those skilled in the art that the inventive concepts set forth in the embodiments described in this application and pertaining to the provision of querying an image database by image content may be embodied in a variety of system contexts. One such system is illustrated by way of example in FIG. 1 wherein a data processing system generally indicated by 10 includes a processing unit 12, a video display unit 13, and a cursor control system including a screen cursor 15 and a mouse 16. The mouse is a conventional user-actuatable cursor positioner for providing control inputs to the data processing system 10. The data processing system 10 further includes a data storage mechanism 17 which may include various peripheral drives (not shown) and local memory (also not shown) utilized by the data processing system 10 to execute programs, control various hardware and software entities of the system, and to store data.

The data processing system 10 may be selected from any number of conventional processor devices, including, but not limited to, processors commonly found in a class of data processing apparatus known as workstations. A preferred environment of the invention includes a menu-driven user interface 20 including a cursor control 21 and a window control 22. The user interface 20 operates conventionally to provide a menu-driven visual output on the video display terminal 13 consisting of a plurality of "windows" or "containers" which are used in the practice of the invention. One such window 23 is an image query window, which is used for construction of queries based on image content. Another such window 24 is an image characteristic window containing, in a first embodiment, a plurality of icons (hereinafter "thumbnails") 26 and 27. The user interface further provides through the cursor control 21 the ability to control the cursor 15 by movement of the mouse 16. The cursor 15 is used in the first embodiment to "drag and drop" thumbnails from the image characteristics window 24 to the image query construction window 23. A thumbnail which has been dragged and dropped in the image query construction window 23 is indicated by reference numeral 28.

Once thumbnails have been dragged and dropped in the image query window 23, an option is selected denoting a RUN QUERY command represented on signal path 30. In response, the identification and locations of all thumbnails dragged to and dropped in the image query window 23 are provided to an image database management system 31 on a signal path 33.

The image database management system 31 includes a query-by-image-content (QBIC) engine 32 which receives the RUN QUERY command and thumbnail identification and location information and, using the information and thumbnail definitions stored at 34, constructs a query which is used to search image data representations stored at 35. The results of the search are used by the QBIC engine 32 to construct a result list of images satisfying the query parameters. The identifications of these images are used to obtain the identified images from a set of images stored at 36 and the images in the result list are provided to the window control 22 for display in a results window, which is not shown.

In a second embodiment, described below, respective areas are displayed for presentation of image selection characteristics and construction of an image query. These areas may be in the same, or separate windows. The cursor control in the second embodiment is used to "point and click" on a selected image characteristic. By this means, the cursor is invested with the image characteristic and may be used in the image query construction area to paint or draw an image query. Once the query has been constructed, it is dispatched by the RUN QUERY command. In the second embodiment, the engine 32 has access to (and may include) an element 37 for computing image query values from a spatial grid in the image query construction area.

Figure 2:
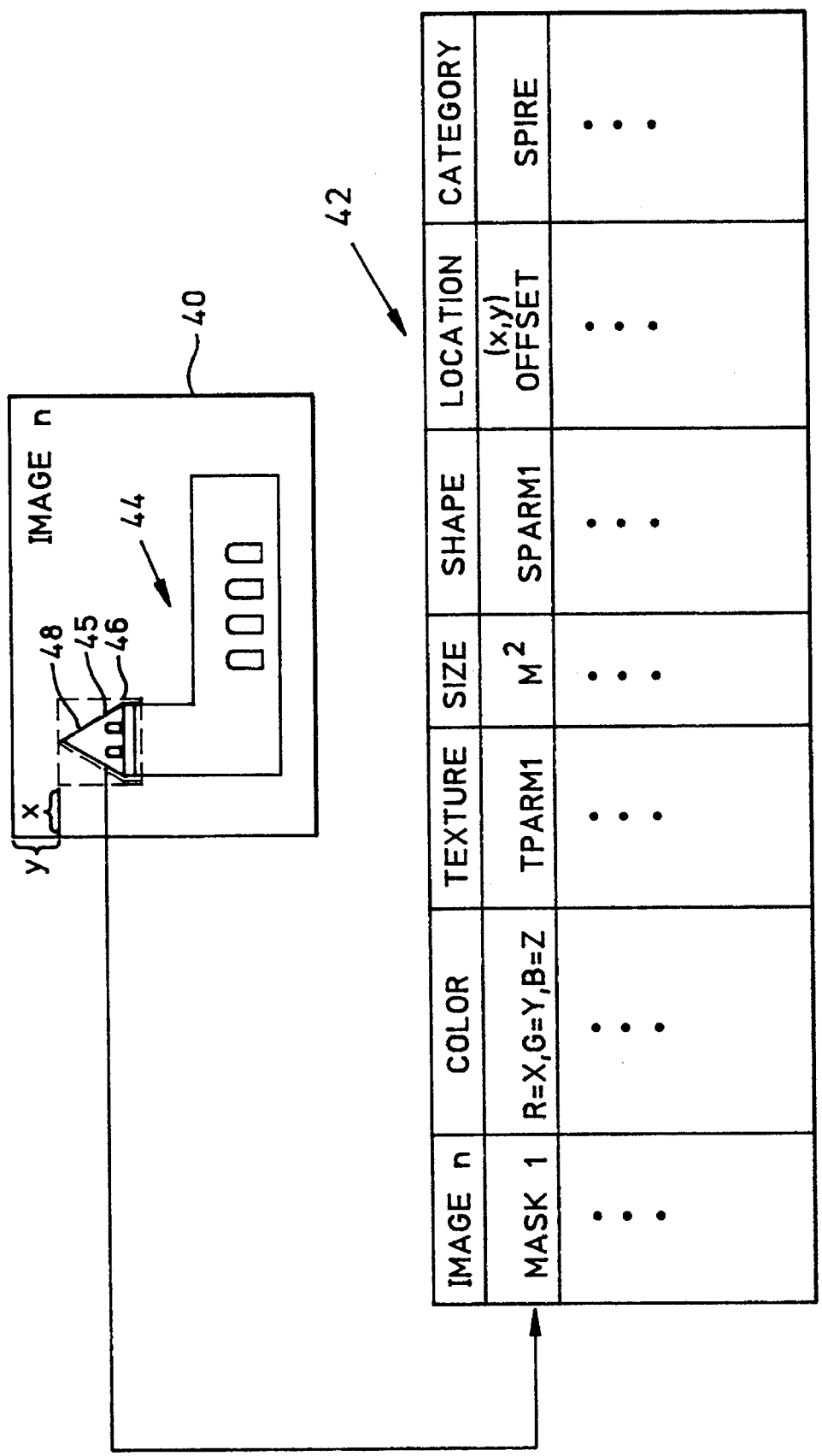
FIG. 2 illustrates how the content of an image is decomposed into tabularized data representations.

FIG. 2 illustrates the structure of an image data representation which enables the structure to be searched in conventional query fashion based on image characteristics. In this regard, for example, an image 40, identified as image n, includes a picture of a church 44 having a bell tower topped with a triangular spire 45. Image n is decomposed into image characteristics including color, texture, size, shape and layout. Arbitrarily, images or image features may be associated with text keywords, image IDs, and categorized by size, origin, and date. The decomposed elements of the image 40 are digitized and tabularized in order to construct the data representation 42. Relatedly, consider the spire 45. Using conventional graphical toolbox techniques, a mask 48 can be defined on the image 40 to enclose the spire 45, the mask itself can be characterized by its shape and the pixel data covered by the mask can be analyzed to determine its color and texture characteristics. In particular, the color of the spire 45 can be decomposed to average red, green and blue values, and texture parameters (TPARMs) can be obtained by known methods, one of which is described, for example, in the Tamura et al article discussed in the Background section of this application. The size of the mask is simply the pixellated area enclosed by the mask 48, while the shape of the enclosed spire 45 can be characterized as shape parameters (SPARMs) by known methods, such as those disclosed by Taubin and Brown, discussed in the Background. The location of the mask may be defined by the offsets in the x and y directions from an origin at the upper-left hand corner of the image 40 to a point in a bounding box 46 enclosing the mask 48. This assumes that the image is displayed as a raster-scanned, two-dimensional array of pixels in which the pixels are scanned, line-by-line, beginning with the upper-left hand pixel. Last, the image, or the individual mask to which it is decomposed can be assigned a text/keyword category. For example, if the image n is one image of a set of images all of which have to do with ecclesiastical architecture, the mask containing the spire might be categorized by the single word "spire".

In this manner, the image 40 is decomposed into the data representation 42. The data representation 42 may be organized conventionally as a tabularized file for image n whose rows correspond to the masks into which the image is decomposed and whose columns corresponds to image characteristics.

FIRST EMBODIMENT OF THE INVENTION

Thumbnail data representations (definitions) which are used in the first embodiment of the invention are stored as described with reference to FIG. 1, and have the general form illustrated in FIG. 3. In FIG. 3, thumbnail definitions for color, texture, size, shape, and category are indicated, respectively, by reference number 60, 62, 64, 66 and 68. Each thumbnail definition represents one of a plurality of thumbnail definitions for a particular referenced characteristic. For example, the thumbnail definition 60 is a data representation for a color thumbnail which may be denoted as a thumbnail M representing a color M. In this regard, M would be the identity of a thumbnail contained in a color characteristic window presented on the display 13 in FIG. 1 during query construction. The definition for the color thumbnail M is a data structure indexed by the identity of the color thumbnail and including average intensity values for the red, green and blue component of the color M. The definition 62 for texture thumbnail P denoting a smooth texture includes the identity (P) for the smooth 10 texture thumbnail and a data representation for a smooth texture. The data representation can, for example, be represented by a set of texture parameters including coarseness, contrast and directionality. Similarly, the size thumbnail Q represents the size of a pixellated area; the shape thumbnail S can include a data representation using an algebraic moment invariant; and, the spire category thumbnail includes, for example, the text "spire" or additional textural annotation. Note that a layout thumbnail is not required since the location of the bounding rectangle of any thumbnail in the image query window 23 would be available through the window control 22 to the query engine 32.

It should be evident that at least the characteristics of color, texture, size and shape are quantifiable. As discussed above with respect to FIG. 2, each image in the database has a corresponding data representation in which the calculated values for these characteristics are stored for each defined region of interest (mask) in the image. For every mask, specific values for the image characteristics describing visual properties for the mask are calculated and entered into the data representation. Later, when a query is assembled, an object/thumbnail procedure described below is employed to construct a description (a "sample image") of the images which a user wishes to retrieve from the image database, with the query being constructed in terms of values of the image characteristics of interest. The query is used to find images in the database with image characteristic values that are similar to those included in the sample image. To do a query, the QBIC engine 32 converts pictorial query information (e.g., the information from the thumbnails and their location) from the image query window into image characteristic values.

Figure 4:
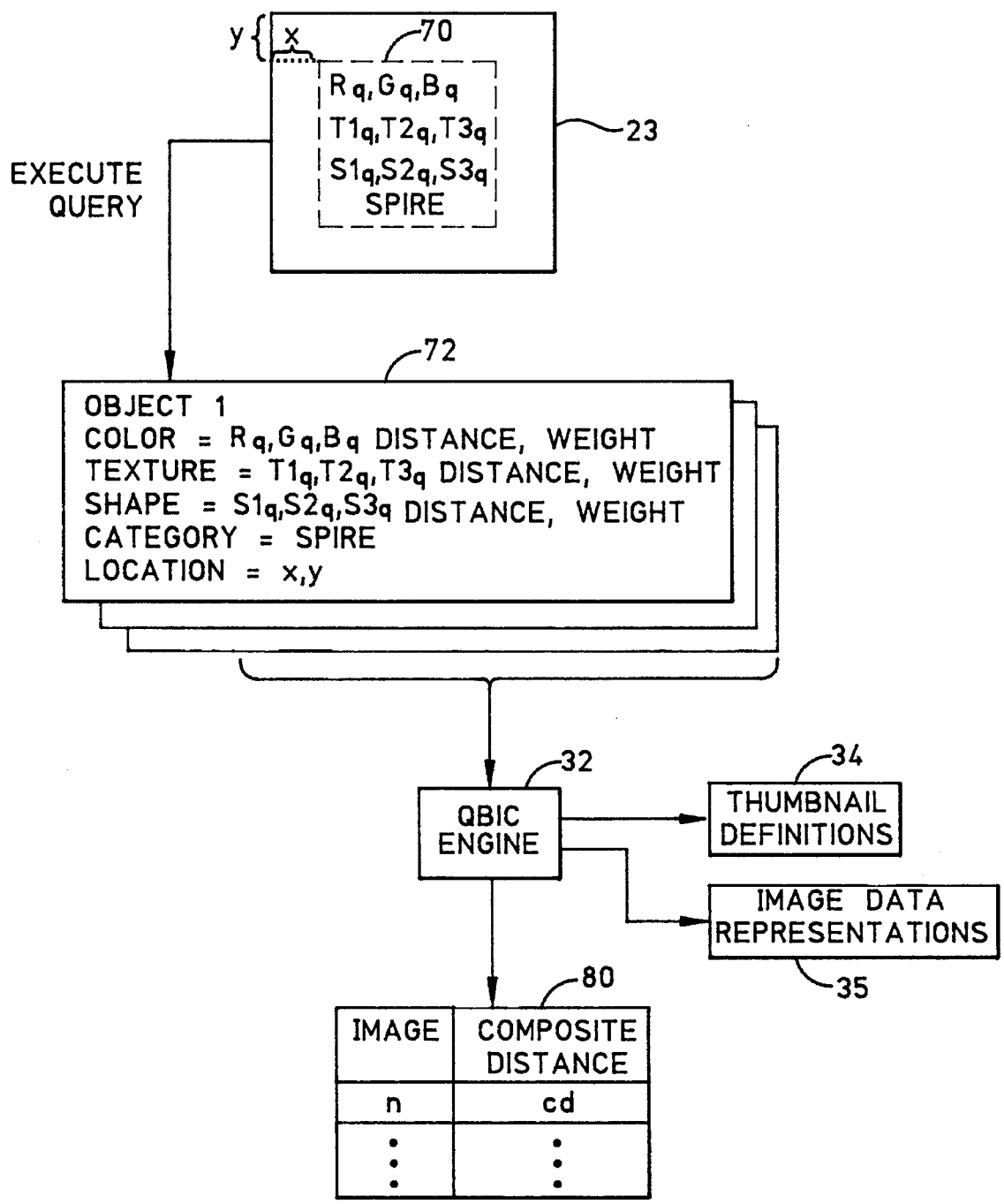

FIG. 4 illustrates diagrammatically the essential process for image query construction and execution where the query is composed by dragging and dropping thumbnails. Initially, a query is assembled by dragging and dropping characteristic thumbnails in the image query window 23. The deposit of a thumbnail creates an object 70. A thumbnail may overlap other thumbnails within the same object. For example, in the object 70, thumbnails for shape (in SPARMS, such as $S1_q$, $S2_q$, $S3_q$, ...), category (spires), color (in color components, such as $R_q$, $G_q$, $B_q$), and texture (in TPARMS, such as $T1_q$, $T2_q$, $T3_q$) overlay each other within a bounding rectangle which defines the object 70. When a query option is selected, the RUN QUERY command is sent, together with a description of all objects in the query window 23 to the QBIC engine 32. For each object, the description includes the identification of the thumbnails within the object and the object's location measured by the offset between its center and the center of the image query window 23. When the RUN QUERY command is given, the QBIC engine 32 interrogates the window control 22 as to objects which are contained in the image query window 23. Each object is described in a data structure, with the data structure for the object 70 indicated by reference numeral 72. Each object data structure includes the identification of the thumbnails which it contains, as well as the offset values significant of its location. The QBIC engine 32 then assembles a query whose predicate includes a portion for each object contained in the query window. Each object portion of the query predicate includes, in any order appropriate to the design, parameters which correspond to the set of image characteristics. The values for those parameters are obtained from the thumbnail definitions 34. If an object does not contain a thumbnail for a particular characteristic, the parameter value for that characteristic is undefined.

The query assembled by the QBIC engine 32 essentially compares the image characteristic values obtained by image query window 23 and the thumbnail definitions 34 against the values for the corresponding image characteristics contained in the image data representations 35. Similarity may be measured, for example, by the euclidian distance (d). For each image, a composite euclidian distance (cd) is calculated between each image object and similarly located masks.

A comparison is performed using the usual query techniques with the following elaboration. For each image data representation, all objects in a query are compared with masks in the data representation, and a composite distance between the image corresponding to the data representation and the sample image is calculated according to:

$$(cd)_{image\ n} = \sum_{i=0}^{k} cd_{mask\ i} \tag{1}$$

Thus, the composite distance ($cd_{image\ n}$) between image n and the sample image is the sum of composite distances ($cd_{mask\ i}$) between masks of the image and the objects of the query. The composite distance between a mask i and an object j is the sum of weighted euclidian distances between the calculated image characteristics (color, texture, size, shape) and the value for the corresponding thumbnail characteristics. The composite distance between mask i and an object is given by equation (2), wherein:

$$(cd)_{mask\ i} = (w_{color}d_{color} + w_{txtr}d_{txtr} + w_{size}d_{size} + w_{shape}d_{shape}) \tag{2}$$

In equation (2), the euclidian distance (d) for each calculated image characteristic is weighted by a value w which is assigned by default or by user action described below when the sample image is constructed in the image query window 23.

In the first embodiment, the composite distance calculation for a mask is performed subject to conditions. First, if the object includes a category thumbnail, the calculation is performed only for identically categorized masks. Second, the object and mask locations may be compared and thresholded. In this regard, if a mask is located more than a predetermined scalar distance from an object, the euclidian distance between the object and the mask is not calculated.

Similarity between the value of an image characteristic in an object of a query image and the value of the image characteristic in an image mask can be measured by euclidian distance with features first normalized by variance (a) of the characteristic over the entire image database to correct scaling inconsistencies, although other similarity measures may be employed. For example, when querying on RGB color, the distance between mask i and object j is computed as:

$$(d_{ij})_{color} = \frac{(red_i - red_j)^2}{\sigma^2_{red}} + \frac{(green_i - green_j)^2}{\sigma^2_{green}} + \frac{(blue_i - blue_j)^2}{\sigma^2_{blue}} \tag{3}$$

Combining textural, size and shape features is done similarly, by appropriate variation of terms.

The inventors contemplate that the distance calculations for any characteristic value may be thresholded. Thus, assume prespecification of DISTANCE thresholds such as illustrated in FIG. 4. If the distance calculations for any characteristic yield a distance value which exceeds the prespecified DISTANCE value, the calculated value is replaced by zero.

As the QBIC engine 32 executes the query, it assembles a results list 80 which identifies images and ranks them according to their composite distance values. The results list 80 may include all images or only a prespecified number of the closest images. The results list 80 indexes to the images stored at 36, and is passed by the QBIC engine 32 to the window control 22. The window control 22 retrieves the images in the results list from the image storage 36 and formats them appropriately for display in a results window on the display 13.

OPERATION OF THE INVENTION ACCORDING TO THE FIRST EMBODIMENT

Figure 5:
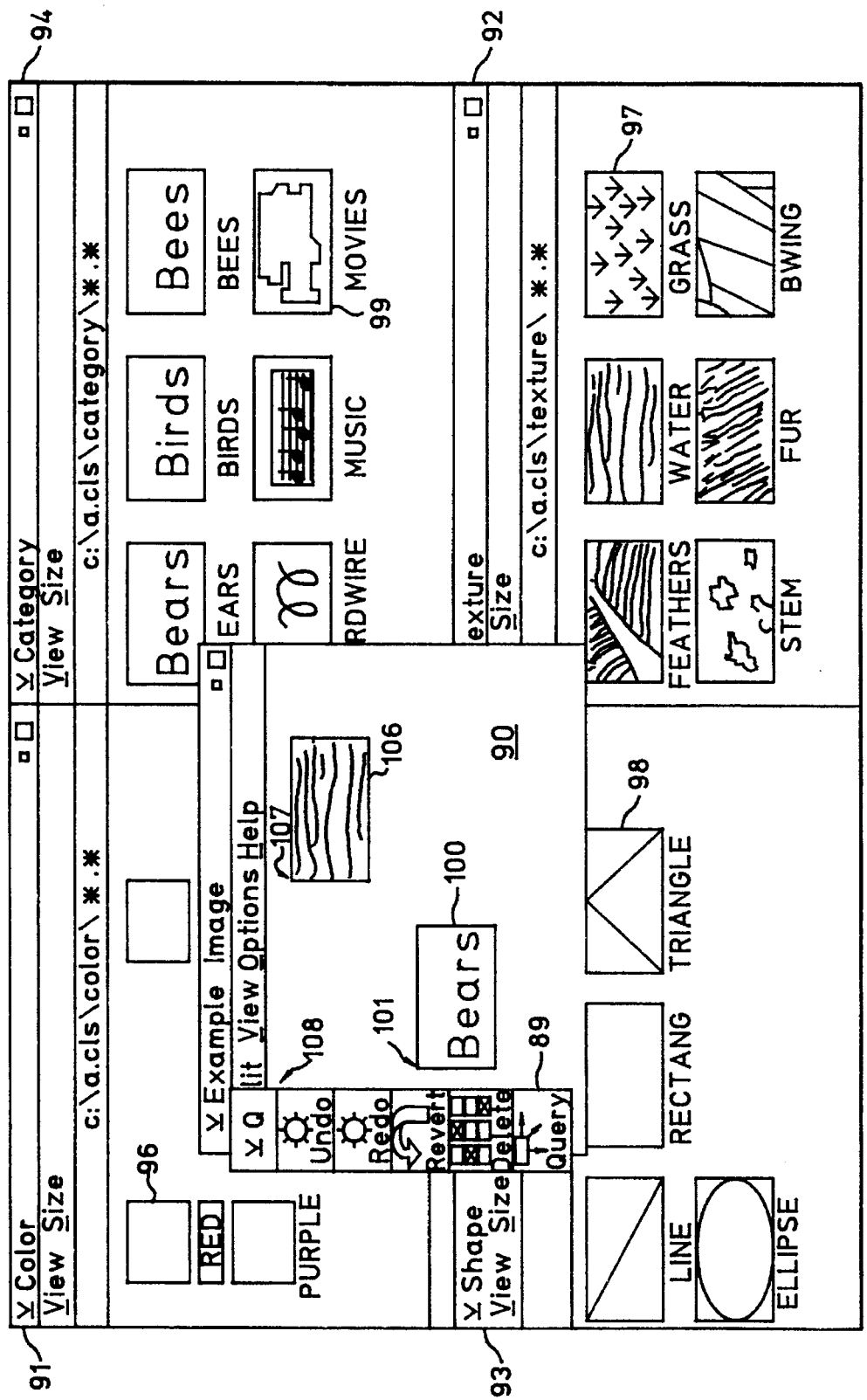

The image query process executed by the apparatus illustrated in FIG. 1 is guided by the display of windows illustrated in FIG. 5, which show the invention in a first embodiment. Initially, an image query screen 90 entitled "Example Image" is displayed. This corresponds to the image query window 23 described above with respect to FIGS. 1–4. The example image window 90 is where users construct a sample image representing the important aspects of the images being sought. The example image window 90 includes a image query (iq) icon 89 on which user may "click" to begin an image query. Alternately, a query object may be dragged to the image query icon 89 or an appropriate command may typed into a command line (not shown).

In the first embodiment of the invention, four selection windows (containers) are employed: a color container 91, a texture container 92, a shape container 93, and a category container 94. The containers 91, 92 and 93 correspond to characteristics which are innate in an image and which can be calculated as described above from image content. The category characteristic is an arbitrary textual tag which can be appended to an image or an image mask. Each of the selection containers 91–94 contains one or more icons, which are referred to, preferably, as "thumbnails". Each thumbnail in one of the image characteristic containers 91, 92 and 93 corresponds to a prespecified value for an image characteristic. For example, the "RED" thumbnail 96 in the color selection container 91 corresponds to a precalculated value for red taking into account all the components of a particular display scheme which contribute to the particular shade of red given by the thumbnail 96. In the texture selection container 92, the "GRASS" thumbnail 97 corresponds to a set of precalculated textural values. In the shape selection container 93, the "TRIANGLE" thumbnail 98 corresponds to a quantized representation of a triangle.

A sample image can be constructed by dragging thumbnails to the example image window 90 from the color, texture, shape and category selection containers. For example, a "BEARS" thumbnail 100 has been dragged from the category container 94 and dropped in the example image window 90. A "WATER" thumbnail 106 has been dragged from the texture container 92 and dropped in the example image window 90. The locations 101 and 107 of the thumbnails 100 and 106 are determined as described above with reference to the example image window origin 108.

The layout of thumbnails in the sample image affects the results of a query. For example, placing two bear thumbnails next to each other in the example image window indicates a preference for adjoining bear objects in the results set of images that will be selected to satisfy the query.

In order to generate a query based on the thumbnails 100 and 106 dropped in the example image window 90, a RUN QUERY option is selected. When the option is selected, a query is constructed as described above which consists of a predicate with an object portion denoting "bears" at a location corresponding to the point 101 and another object portion denoting a "water" texture with a location at 107.

Figure 6:
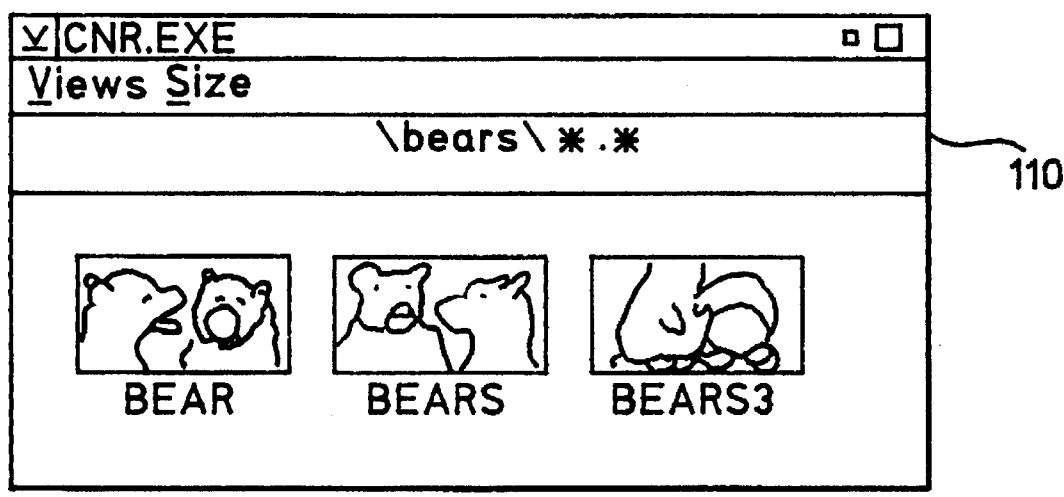

FIG. 6 illustrates how the thumbnails 100 and 106 on the example image window 90 interact with one another to form an image query. In FIG. 6, the "bears/water texture" query returns pictures containing bears and water. The query results are illustrated in a container 110 shown in FIG. 6. The three bear pictures were returned by the query because in each a bear existed slightly off center and there was water in the picture off to the right, which corresponds to the layout information for the two thumbnails illustrated in the example image window 90 of FIG. 5. The order of the returned images is preferably sorted from best to worst match, and the number of images returned can be controlled by manipulation of the thumbnail attributes of weight and distance described above.

The example image window 90 preferably is a rectangle that has the same aspect ratio as the stored images. Dragging and dropping thumbnails from the color, texture, shape and category selection containers onto the example image window permits a user to create an example of the kind of image which the user wishes to find.

The placement of the thumbnail is important because the spatial relationship of the dropped thumbnails is used as described above as part of the query criteria. The characteristics of each dropped thumbnail may be arithmetically or logically combined with other thumbnails in the query constructed by the QBIC engine 32. As described above, thumbnails may be overlapped. As stated previously, when thumbnails of different image characteristics overlap, they are considered to be part of the same object. For example, if the category thumbnail "BEARS" overlaps a "RED" thumbnail, images containing "BEARS" are selected, and in this set, the images are ordered according to their similarity to the "RED" thumbnail. If the "BEARS" and "RED" thumbnails did not overlap, images including bears and red in their respective locations would be returned.

Figure 7:
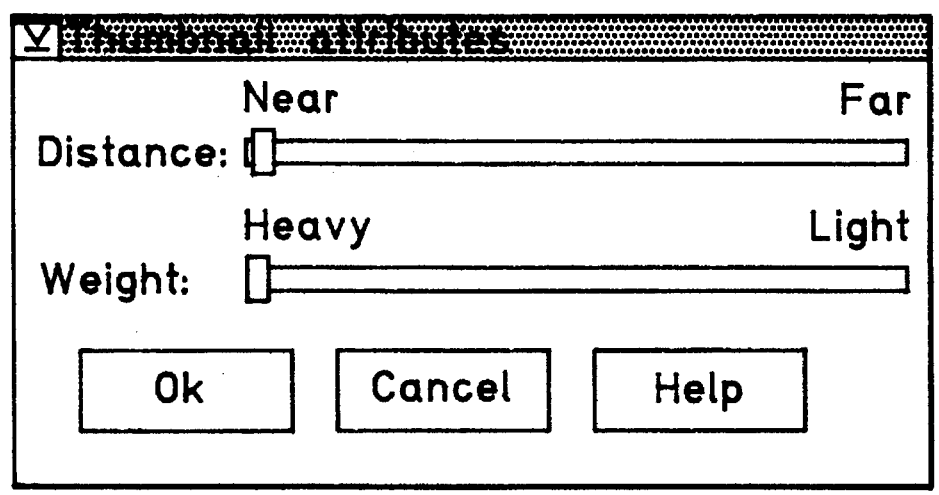

A context dialogue box illustrated in FIG. 7 is displayed when the cursor is placed on a thumbnail and a preselected mouse button is clicked. The context dialogue box provides two control bars for setting, respectively, distance and weight of the thumbnail. Preferably, the setting of the distance control thresholds the value of the thumbnail characteristic, indicating how close the value must be to the value of a mask characteristic in order to include the characteristic in a query calculation. The setting of the weight control determines the weighting factor for this characteristic. Manifestly, the adjustment of thumbnail values for multiple thumbnails can establish a relative weighting among thumbnail values for query construction. For example, suppose, in the "BEAR" and "WATER" example described above, a user is very interested in image color but less interested in the texture of images. In this case, the user would increase the color attribute, but lighten the weight of texture.

Figure 8C:
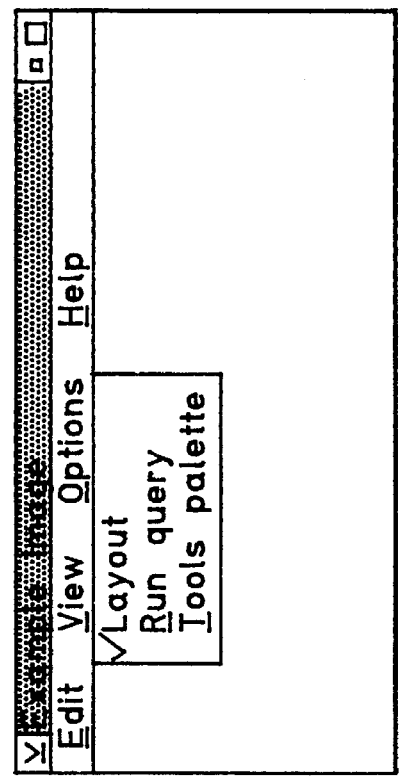
FIGS. 8A–8C illustrate various dialogue boxes displayed during the operation of the invention.
Figure 8A:
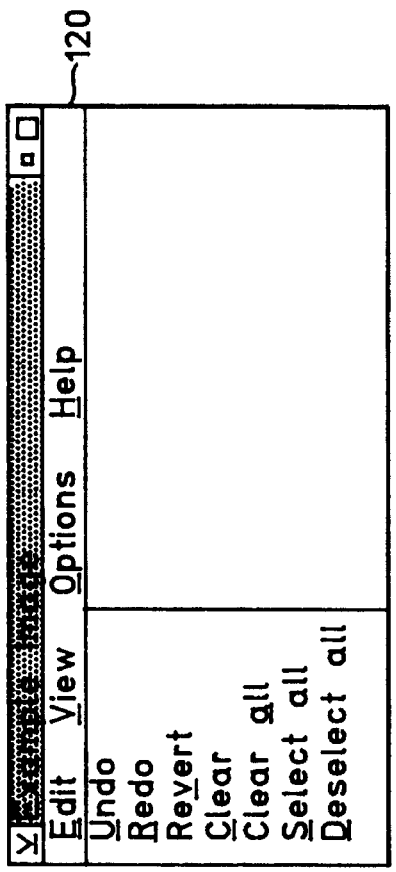

FIG. 8A illustrates an example an image menu bar 120 with an EDIT option pull down 122. The edit option pull down allows thumbnails previously dropped in the example image window to be manipulated. The UNDO option causes the last change in the example image window to be removed. For example, suppose that the "BEARS" thumbnail was dragged and dropped on to the example image window. Clicking on UNDO removes the dropped thumbnail. Selecting the REDO option causes the last undone change to be restored. Thus, clicking on REDO would restore the bear thumbnail in the example image window which was "undone" in the previous action. The REVERT option discards all changes made since the example image window was opened and restores the view of the last version, which may be stored on disk. The CLEAR option deletes all selected thumbnails in the example image window. The CLEAR ALL option deletes all selected objects in the example image window; in this regard, it is the equivalent of SELECT ALL followed by CLEAR. The SELECT ALL option marks all thumbnails in the example image window as selected. "ALL" thumbnails include any that may be hidden beneath other thumbnails. The DESELECT ALL option unmarks all thumbnails previously selected.

Figure 8B:
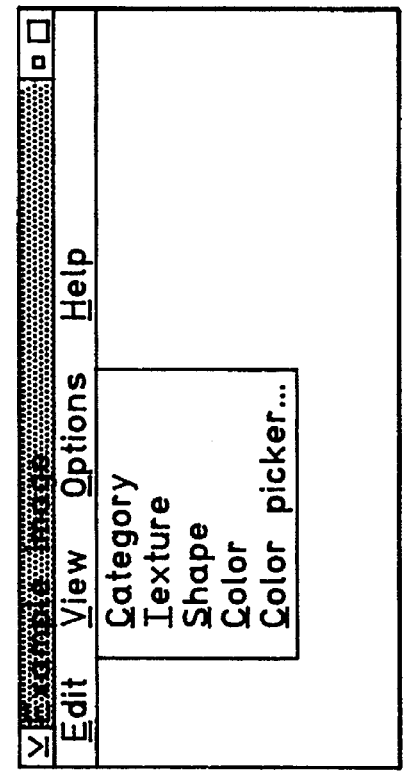

The VIEW option pull down, illustrated in FIG. 8B, controls the visibility of the other selection containers used in image query construction. In this regard, once the example image window is selected and an image query is initiated, the selection windows are conventionally designated as "child" process windows. Thus, when any of the VIEW options is checked, the associated child process selection window appears. If an option is unchecked, the associated child process window disappears.

The COLOR PICKER option displayed in the pull down of FIG. 8B enables the user to set an absolute color using a COLOR PICKER process window. This option allows a user to establish a thumbnail of any selected absolute color. Accordingly, a segmented color pie chart is displayed. To select the displayed color, the user picks a pie segment by moving the cursor to the segment and clicking a mouse button. The selected color is displayed in a "Sample Color" box. To fine tune a selection, the user clicks and drags a cursor anywhere in the pie chart until the desired color is displayed. To display the gray scales of a particular hue, the desired pie segment is double clicked and the color is selected. A following double-click anywhere in the pie chart will return the Color Picker process to the polychrome mode. Moving RED, GREEN or BLUE sliders in the Color Picker window enables a user to mix a color directly. Numbers to the left of the RED, GREEN and BLUE sliders correspond to actual gun values. Pressing an HIS switch switches the three sliders to, respectively, hue, intensity and saturation values. Pressing an OK button dismisses the Color Picker dialogue box and displays a thumbnail of the selected color in the center of the example image window. This thumbnail may then be manipulated like any other.

The OPTIONS pull down from the menu illustrated in FIG. 8A is shown in FIG. 8C. In this menu, the Layout check box enables or disables the spatial relation. When enabled, the thumbnail positional relationships to one another are accounted for as discussed above in the calculation of mask composite distances. If the Layout check box is disabled, the composite distance calculations are not thresholded by the scalar distances between objects and masks. Effectively, if Layout is disabled and the example image window, for example, contains two "bird" category thumbnails, then the query would select all images in the image database that contains at least two birds. The Run Query option corresponds to the RUN QUERY command that, when selected, results in execution of the query.

Figure 9:
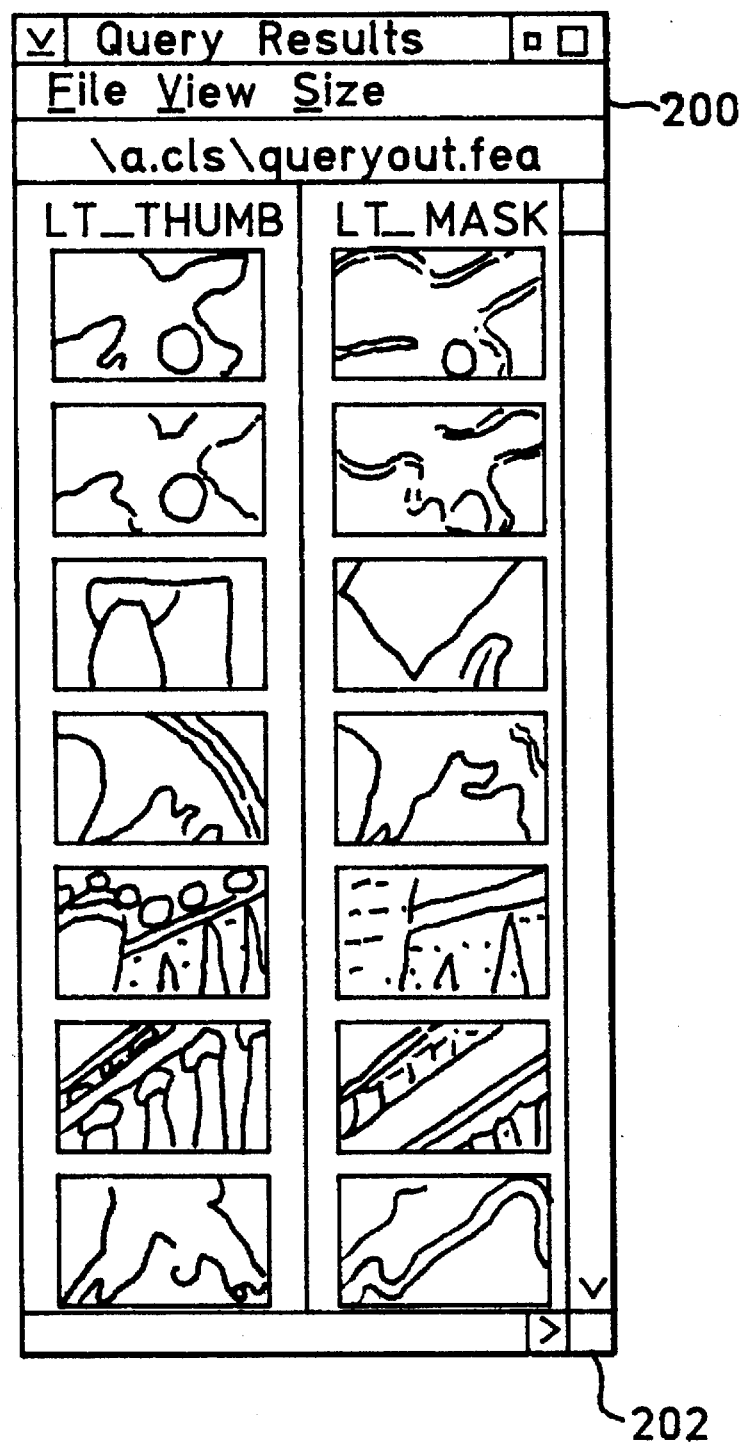

Query results are displayed as illustrated in FIG. 9. In FIG. 9, results are included in a Query Result window 200 which includes at least three columns. The first column (LT_THUMB) includes a thumbnail for a complete image. The second column (LT_MASK) shows a selected sub-area of the image with one or more mask outlines. The third column 202 illustrates graphically the composite distance of an image from the input query. The query results are displayed in the order of most similar to least similar.

Figure 10A:
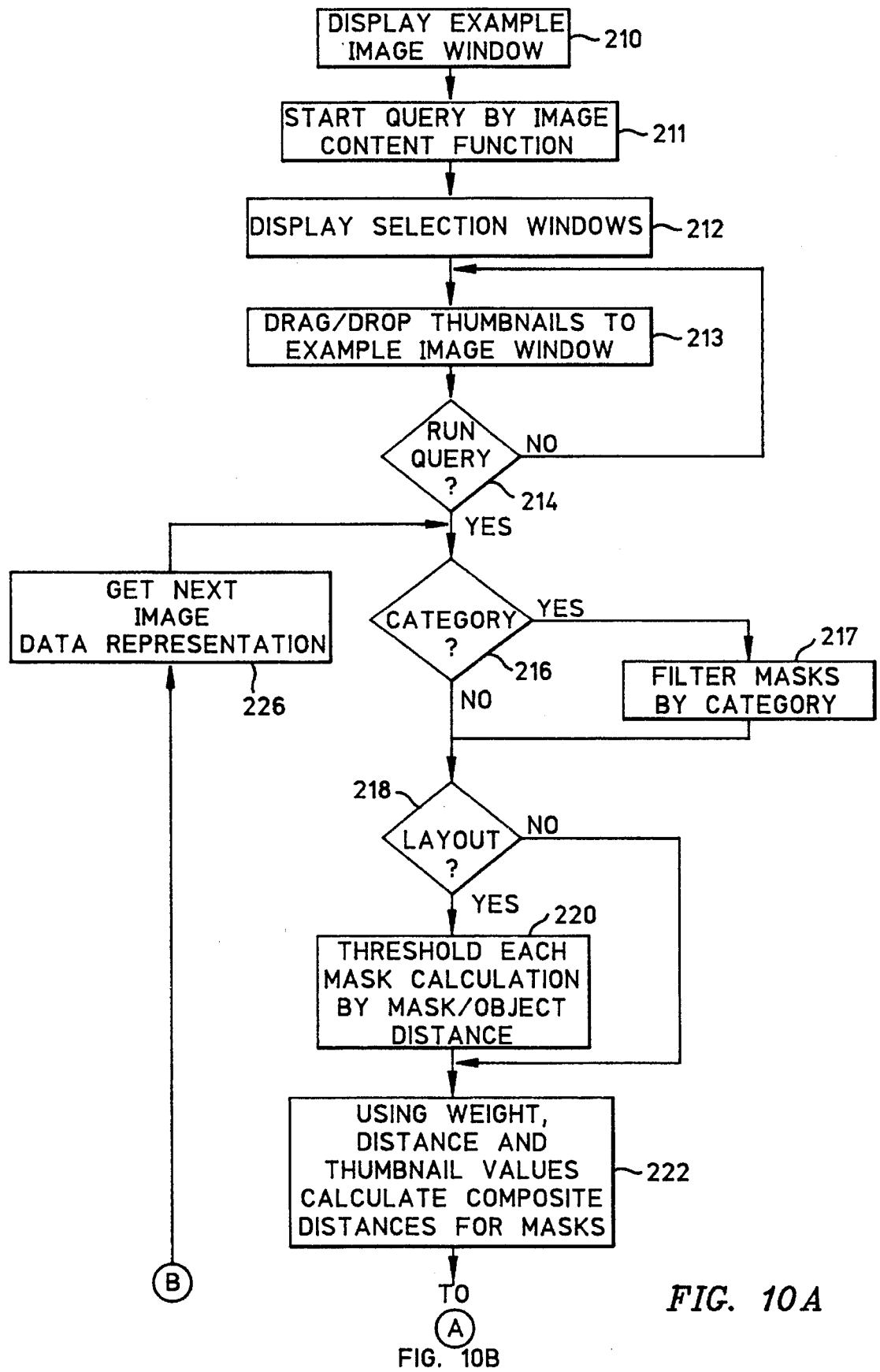
Figure 10B:
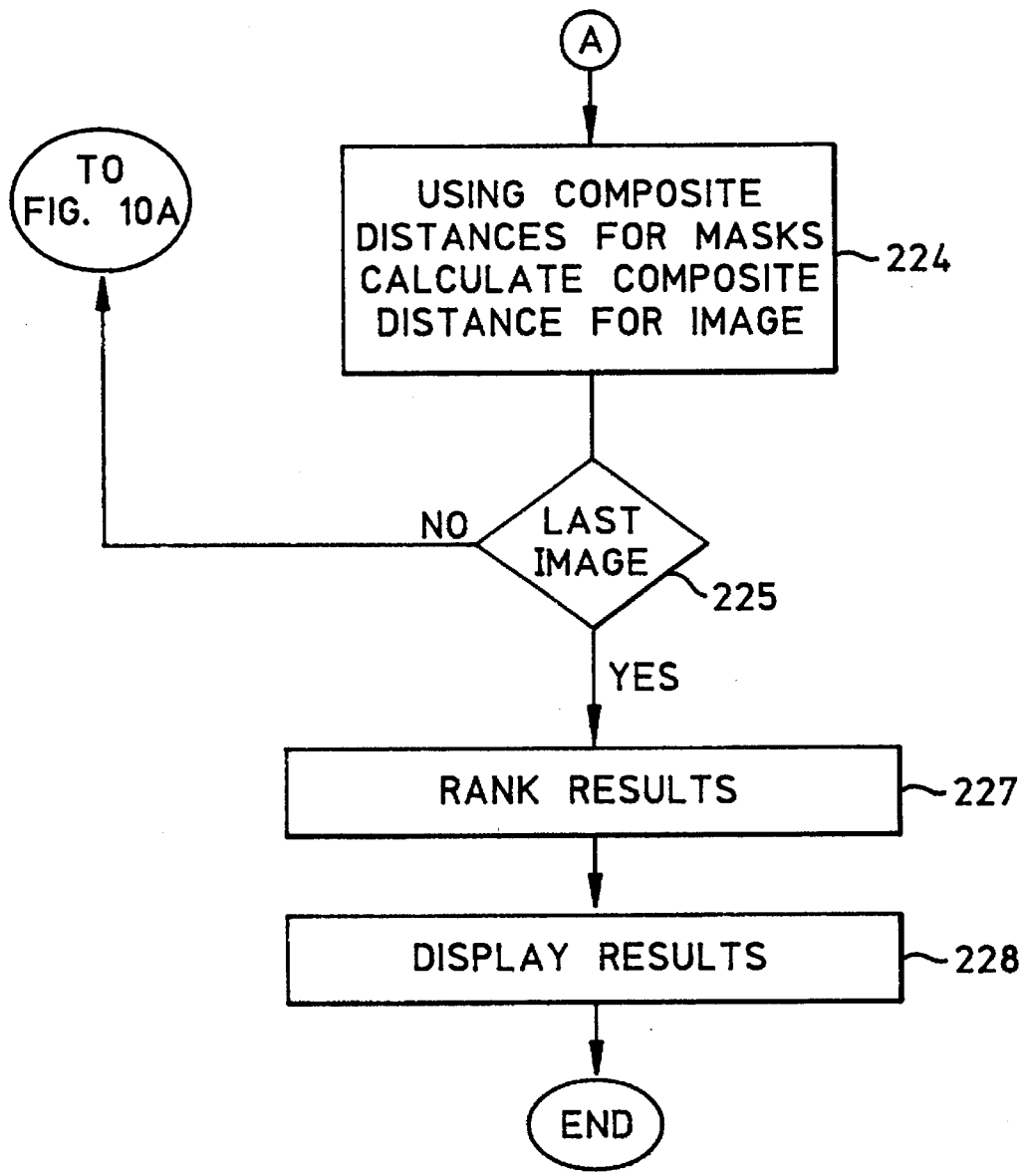

FIGS. 10A and 10B comprise a flow chart describing a process for practicing the first embodiment of the invention. In FIG. 10A, the process is initiated in step 210 by displaying an example image window such as the window 90 illustrated in FIG. 5. A query-by-image content procedure is initiated in step 211 by, for example, selecting the query button 89 in the example image window 90, which issues a RUN QUERY command. In step 212, selection windows are selected and displayed using the view pulldown illustrated in FIG. 8B. Thumbnails are then dragged from selection windows and dropped in the example image window in step 213. For as long the RUN QUERY command is not selected, the negative exit is taken from decision 214 and the sample image being constructed in the example image window can be edited or added to in step 213. When the RUN QUERY command is selected, the positive exit is taken from decision 214 and, for each image in the database, the procedure executes a sequence of steps beginning with decision 216 and ending with step 225. Recall that selection of the RUN QUERY command sends a set of data structures describing objects in the sample image to the QBIC function. Each object data structure is inspected to determine whether the object includes a category thumbnail. If so, the positive exit is taken from decision 216 and the masks in the current image are filtered by the category code in the data structure in step 217. The decision 216 then establishes the set of masks of the current image which will be analyzed for composite distance with respect to the image characteristic values returned in the data structure for this object. The set of masks established in the decision step 216 are then subjected to the composite distance calculations as described above with reference to equations (1)–(3). In step 218, the layout option is inspected. If enabled, the composite distance calculations for each mask are thresholded by mask/object distance in step 220. In step 222, taking account of the outcome of decision 218, composite distances between objects of the sample image and the filtered and thresholded masks of the current image are calculated using the weight, distance, and thumbnail values return for the object in step 222. Next, in step 224, the composite distance for the image is calculated. If the image is not the last in the set of images, the negative exit is taken from step 225 and the composite distance for the next image is calculated as just described. Otherwise, the positive exit is taken in step 225, the images are ranked according to the results of the composite distance calculations in step 227 and the result of the ranking are displayed in step 228.

OPERATION OF THE INVENTION ACCORDING TO A SECOND-EMBODIMENT

Figure 11A:
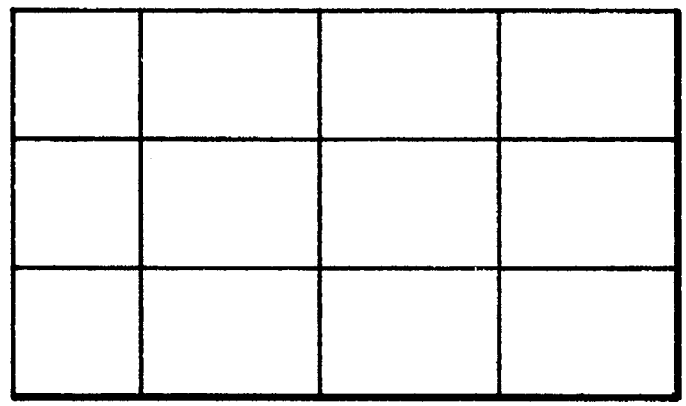
Figure 11B:
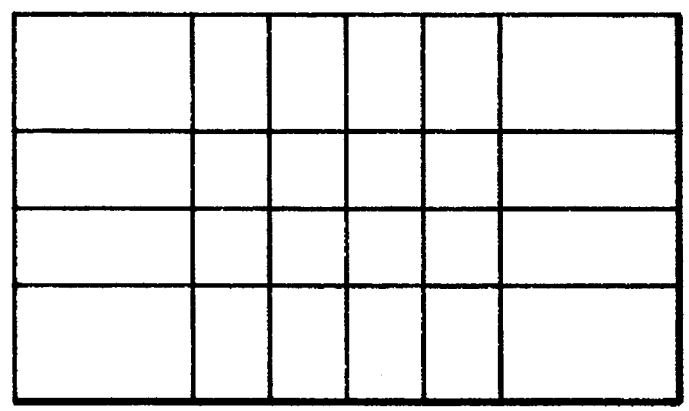

The second embodiment of the invention builds an image query by a user-specified "painting" in an image query area. This embodiment finds images according to a user-specified pattern consisting of image characteristics at specified positions; it includes components corresponding to elements Of the system shown in FIG. 1, as follows::

1. Image Storage. Each image is stored as an I×J array of pixels. Each pixel includes one or more multi-bit words denoting image color at the pixel location, either directly or using a color look-up table.
2. Spatial Partitioning. The pixel array of each image in the image store is spatially partitioned, such as into a rectangular grid, a radial grid providing finer granularity in the center of the image, or any other quantization that fits the image data and application. This partitioning need not be fixed for all database entries. In fact, dynamic mapping may be used for greatly differing resolutions of images, image content based segmentation, or user selection at database population time. Two examples of a spatial partitioning of the images are shown in FIGS. 11A and 11B. The partitioning of FIG. 11A is by a regular grid, dividing each image into a 3×4 array of grid areas. The partitioning of FIG. 11B results in finer grid areas in the center of each image.
3. Feature Computation to populate the database of image representations for use during Image Query. For each image in an image database, using the areas defined by the partition in Step 2, a set of image characteristics is computed for each area. Possible image characteristics include measures such as image color, texture, and/or edge content. The area and characteristic information are stored in the storage reserved for image data representations.

The feature computation algorithm can be represented as:

```
For each image I(j) in the image collection
    For each area A(k) defined by the spatial partition
        For each image feature F(l) (such as color features,
            texture parameters, etc.)
                Compute feature F(l) over area A(k)
        End
    End
    Store in the database the set of F(l) for each A(k)
End
```

The result of this step is a table or database such as is shown in Table I containing the computed information. This example is for r total features, s different areas in the spatial partition, and t total images in the image collection. The inventors have used F(j,k,l) to represent the l-th feature in the k-th area in the j-th image.

TABLE I

| I(1) | A(1) F(1,1,1,) F(1,1,2) F(1,1,3) ... F(1,1,r) |
| | A(2) F(1,2,1,) F(1,2,2) F(1,2,3) ... F(1,2,r) |
| | A(3) F(1,3,1,) F(1,3,2) F(1,3,3) ... F(1,3,r) |
| | A(4) F(1,4,1,) F(1,4,2) F(1,4,3) ... F(1,4,r) |
| | . |
| | . |
| | . |
| | A(s) F(1,s,1) F(1,s,2) F(1,s,3) ... F(1,s,r) |
| I(2) | A(1) F(1,1,1,) F(1,1,2) F(1,1,3) ... F(1,1,r) |
| | A(2) F(1,2,1,) F(1,2,2) F(1,2,3) ... F(1,2,r) |
| | A(3) F(1,3,1,) F(1,3,2) F(1,3,3) ... F(1,3,r) |
| | A(4) F(1,4,1,) F(1,4,2) F(1,4,3) ... F(1,4,r) |
| | . |
| | . |
| | . |
| | A(s) F(2,s,1) F(2,s,2) F(2,s,3) ... F(2,s,r) |
| I(3) | A(1) F(3,1,1) F(3,1,2) F(3,1,3) ... F(3,1,r) |
| | . |
| | . |
| | . |
| I(t) | A(1) F(t,1,1,) F(t,1,2) F(t,1,3) ... F(f,1,r) |
| | A(2) F(t,2,1,) F(t,2,2) F(t,2,3) ... F(f,2,r) |
| | A(3) F(t,3,1,) F(t,3,2) F(t,3,3) ... F(f,3,r) |
| | A(4) F(t,4,1,) F(t,4,2) F(t,4,3) ... F(f,4,r) |
| | . |
| | . |
| | . |
| | A(s) F(t,s,1) F(t,s,2) F(t,s,3) ... F(t,s,r) |

Figure 12:
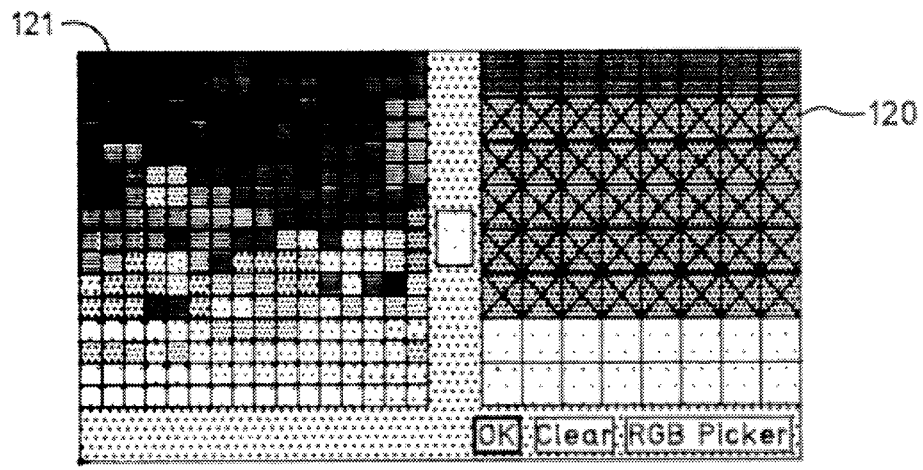
Figure 13:
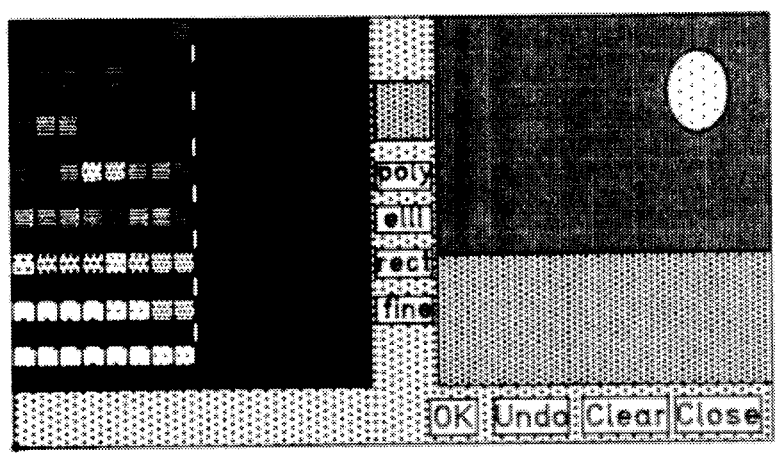

4. Query specification. To specify a query, obtain an approximate specification of the image characteristics that occur in some area or areas of the image. Specification of image characteristics in only a few areas is explicitly supported. The specification can be obtained from a set of thumbnails, an interactive feature "picker" in an image characteristics window, or from another image. Single or multiple features may be specified per area. Examples of feature "pickers" used to obtain a query specification are:

a. Display a block "positional picker". An example is shown in FIG. 12. The example allows a user to specify a query based on positional color feature by explicity drawing or painting them in a block-like manner. In this regard, the image query composition area 120 is two-dimensionally partitioned in a similar, but not necessarily the same manner as the images. For example, the grid in the query area 120 is partitioned into 64 grid positions. The color characteristic area 121 displays a multi-dimensional array of color choices. Any color may be picked from the color choice array and placed in any grid position of the query composition window. The algorithm supporting the picker is:

```
Repeat until the user clicks on the OK button
    If the user clicks on a color box in the left side of the menu
        Make this the current color
    If the user clicks on a grid box in the right side of the menu
        Place the current color in the grid box
End
Return an array of the set of grid boxes with their
    associated color
``` b. Display a freehand "positional picker". An example is given in FIG. 13 in which the user is allowed full freehand drawing in the image query window. The example shows green (grass) in the bottom portion of the image, blue (sky) in the top portion, and a yellow circle (the sun). The algorithm supporting this picker is:

```
Repeat until the user clicks on the OK button
    If the user clicks on a color box in the left side of the menu
        Make this the current color
    If the user draws in the drawing area in the right side
        of the menu
            Paint the user drawing with the current color
End
Return a drawing area containing the drawn, colored shapes
``` c. Display an image (call this the query image) and let the user outline areas of the image that are "relevant". That is, the user draws polygonal "areas of interest", and all remaining area is considered "don't care". The algorithm supporting this picker is:

```
Display an image
Let the user draw (multiple) polygonal areas on the image
Return a copy of the image in which pixels in the polygonal areas
    are unchanged, all others flagged as "don't care"
```

These examples use color as the positional feature. Other features, such as positional texture, may also be used.

5. Similarity matching. For each image in the collection, compute its similarity score:

(a) For each area specified in the query, compute a positional feature score that compares the area's similarity to the image areas computed in Step 3. This score combines both features along with positional similarity so that areas with similar features get higher scores, dissimilar features get lower scores, and areas positionally close get higher scores, and areas positionally far get lower scores. The result is a score, for each query area, of its positional feature similarity within this image. The highest scores will be obtained by areas both positionally close and with similar features. Indexing techniques could be used to increase the performance of searching for the "best" matches.

(b) Combine the scores of all query areas to give a global score for the image.

(c) Rank the images by their global scores and return, as the results of a query, the images with the best scores.

An algorithm supporting similarity matching is:

```
For each image I(j) in the image collection
Initialize the similarity score S(j) for this image
If necessary, map the features of the picker and the features from
    the query (e.g., the picker) to a common spatial grid
For each are A(k) defined by the spatial partition
    For each image feature F(l)(such as color features,
        texture parameters, etc.)
        If the user specified a value for this feature in this area
            (that is, if Q(l) is not "don't care")
            Compute a similarity score between the picker feature
            Q(l) and the image feature F(j,k,l) for this area.
            The scoring is flexible in that it accounts for
            approximately matching in both the feature
            values and in their position by looking in
            neighboring areas.
            Accumulate this score in S(j)
        Endif
    End
Endif
Order the set of similarity scores S(j)
Display to the user the images with the best similarity scores
```

The step above of mapping the picker features and query features is necessary if they are given on a different spatial grid. For example, if the set of areas $A(1), \ldots, A(s)$ in Step 2 over which the image features have been computed correspond to an 8×8 grid, and the freehand positional picker were used, then a 64 element query array Q, with one element for each of the 8×8 grids, can be computed as:

```
Divide the freehand drawing into an 8×8 grid
For each grid area in the freehand drawing
    Find the number of pixels in the area of each possible color
    Find the color C with the largest number N(C) of drawn
    pixels
    If N(C) is larger than some threshold (say ¼ of the size
        of the grid area)
        Set the query array element Q(s) for this grid area to C
    Else
        Set the query array element Q(s) for this grid
        area to "don't care"
End
Similarly, if the image masking picker were used, feature values
from the query image within the areas covered by the
drawn polygons are averaged in each area
corresponding to the 8×8 grid.
```

In summary, the matching algorithm described above consists of two parts. The first is done once per image, for example, when an image is loaded into the database, and consists of computing and storing data about the image. The second is the actual matching, done at query time.

A specific example of the second embodiment is as follows:

IMAGE STORAGE

As described above, each image consists of an array of pixels describing the color of the corresponding image location.

Each image is partitioned into an N X M set of blocks. Other partitions may be used, such as irregular partitions, partitions with finer resolution in the image center where more detail is expected, etc. In this embodiment, blocks correspond to the set of boxes used in the image query composition window 120 of the user interface. The blocks are of approximate size (number of image lines/N) lines by (number of image pixels per line/M) pixels. Let B be the number of partitioned blocks, M X N.

FEATURE COMPUTATION

In this example, color is used as the image characteristic. It can be represented as average color or, alternately, as a list of the most frequently occurring colors in each block. For the latter case, within each block, a k-level color histogram (typical values of k are 32, 64, and 256) is computed, and the top t values are kept, where typically t<k, giving a table for each image of the form:

TABLE II

| BLOCK | COLOR | COUNT | COLOR | COUNT | ... | COLOR | COUNT |
|---|---|---|---|---|---|---|---|
| 1 | $c_1(1)$ | $p_1(1)$ | $c_1(2)$ | $p_1(2)$ | ... | $c_1(t)$ | $p_1(t)$ |
| 2 | $c_2(1)$ | $p_2(1)$ | $c_2(2)$ | $p_2(2)$ | ... | $c_2(t)$ | $p_2(t)$ |
| 3 | $c_3(1)$ | $p_3(1)$ | $c_3(2)$ | $p_3(2)$ | ... | $c_3(t)$ | $p_3(t)$ |
| 4 | $c_4(1)$ | $p_4(1)$ | $c_4(2)$ | $p_4(2)$ | ... | $c_4(t)$ | $p_4(t)$ |
| . | . | . | . | . | . | . | . |
| . | . | . | . | . | . | . | . |
| B | $c_T(1)$ | $p_T(1)$ | $c_T(2)$ | $p_T(2)$ | ... | $c_T(t)$ | $p_T(t)$ |

$c_1(1)$ is the color (or index of the color) in the color histogram of the bucket with the largest percentage of pixels in the first (i.e., upper left) block of the image, $p_1(1)$ is the percentage of the pixels in that image block that fall in this bucket, and, in general, $c_i(k)$ and $p_i(k)$ are the color and percentage, respectively, for the histogram bucket with the k-th largest percentage of pixels in block i.

This table (excluding the first column, which is not stored) is computed and stored for each image. Its size is B X 2t when t<<k but most B X k. (When t≈k, efficient coding techniques can be used, such as listing excluded values of color, or, when t=k, omitting the values altogether.)

QUERY SPECIFICATION

A sample user interface (the one implemented by the inventors) for the case of color features consists of the image query composition window 120 or "blackboard" as shown in FIG. 12, divided into an N X M array of boxes. A user fills in rough color-and-position estimates by selecting a color from the available set of colors in the color characteristic window 121 and dropping it in any set of boxes. A color may be dropped in multiple boxes, and additional colors can be dropped in other boxes. Boxes in which no color is dropped are "don't care". An example completed query specification is shown in FIG. 12.

SIMILARITY MATCHING

Once a set of boxes has been colored, the query is initiated. The method finds images in the database that have approximately the specified color in approximately the specified position.

The matching process takes the specifications of a query and ranks images in the database according to how well they match the query. Inputs to the matching are the query specifications from the image query construction window, and the tabular data described above. Output is a ranked list of the images in the database, ranked in order of their match to the query specification.

The matching process requires a color similarity function ($s_c$) giving the similarity between any two colors. To define this, the process starts with a color distance function. Many choices are possible. Euclidean distance in L*a*b* space may be used, for example. This distance function is referred to as $d_c(color_1, color_2)$. From this, the color similarity function is defined as:

$$s_c(color_1, color_2) = 1 - d_{c(color_1, color_2)}/(max d_c) \quad (4)$$

where max $d_c$ is the maximum value of $d_c(color_1, color_2)$ over all color pairs. Similar colors have $d_c$ near zero and $s_c$ near 1; different colors have $d_c$ large, and $s_c$ near 0.

The query specification from the image query construction window is a list $q_i$, i=1, ..., MxN giving the selected color for each block. $q_i$ can be specified as a triple of red, green, and blue values (r,g,b), an index into a pre-selected color table, or any convenient method of specifying a color. Some method is used to indicated a "not specified" or "don't care", such as a special value of $q_i$ or a separate binary array.

For each image in the database, matching is performed as follows. For each block for which $q_i$ is not "don't care", the similarity between the color $q_i$ in the i-th block and the colors in the corresponding block of image h is computed. An example block similarity function is:

$$s_i^h = \sum_{k=1}^{t} p_i^h(k) s_C(q_i, c_i^h(k)) \quad (5)$$

To make the similarity matching robust to position, the process also searches in neighboring image blocks for good color similarity, and extends the similarity matching to match query block i with image block j:

$$s_{i,j}^h = \sum_{k=1}^{t} p_j^h(k) s_C(q_i, c_j^h(k)) \quad (6)$$

Using this position-robust measure, the similarity score $s_i^h$ for block i in image H is:

$$S_i^h = \max_{j \in \text{neighborhood\_of\_}i} w_{i,j} s_{i,j}^h \quad (7)$$

where $w_{ij}$ is a weighing function that increases the similarity of blocks close to block i. In this implementation, a neighborhood is used consisting of i and its 8-neighbor blocks, and $w_{ij}=\frac{1}{2}$ for i=j, $w_{ij}=\frac{1}{3}$ for 8-neighboring j values, while $w_{ij}=0$ for the other blocks.

The final position color similarity for image h over all $q_i$ is:

$$S^h = \Pi_i S_i^h \quad (8)$$

where the product is over all i for which $q_i$ is not "don't care".

Figure 14:
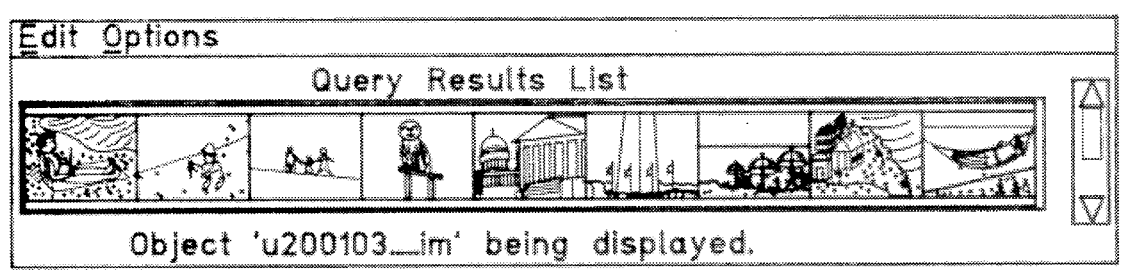

Query results are shown in FIG. 14.

In the view of the above description, it is likely that modifications and improvements will occur to those skilled in the art which are within the scope of the accompanying claims.

We claim:

1. A computerized method of retrieving images from an image data base, comprising the steps of:

receiving a depictive specification of one or more image characteristics of a search image, the specification including a type, a location, and a weight of the one or more image characteristics;

executing a query for images in the image data base that are similar to the search image by:

determining whether an image in the image data base has an image characteristic of the type and near the location of the one or more image characteristics of the search image; and determining similarity between the image and the search image according to the weight of the one or more image characteristics of the search image;

accumulating a set of images determined to be similar to the search image; and providing the set of images ranked in an order according to a degree of similarity to the search image.

2. The method of claim 1, wherein the one or more image characteristics include color.

3. The method of claim 2, wherein the one or more image characteristics include texture.

4. The method of claim 2, wherein the step of receiving the specification includes:

displaying an image query window and receiving a representation of the one or more image characteristics in the image query window;

the location of the representation into the window defining the location of the one or more image characteristics.

5. The method of claim 4, wherein the representation is an icon.

6. The method of claim 2, wherein the step of receiving the specification includes partitioning the search image into a plurality of partitions, each partition being a specification of the one or more image characteristics according to location.

7. The method of claim 6, wherein the step of partitioning includes outlining areas of the search image, each outlined area being a specification of the one or more image characteristics according to location of the outlined area.

8. The method of claim 7, wherein the areas are polygonal areas.

9. The method of claim 2, wherein the type of the one or more image characteristics is a color.

10. The method of claim 9, wherein the color is defined by a group of color components.

11. The method of claim 10, wherein the group of color components is a group of (RGB) components.

12. The method of claim 1, wherein the step of receiving the specification includes receiving specifications of a plurality of image characteristics and the step of determining similarity includes, for each specified image characteristic, calculating a composite distance between the specified image characteristic and an image characteristic located near a location specified for the specified image characteristic, and combining composite distances for the plurality of specified image characteristics according to weights specified in the specifying step.

13. The method of claim 12, wherein the plurality of specified image characteristics includes color.

14. The method of claim 13, wherein the plurality of specified image characteristics includes texture.

15. The method of claim 1, wherein the one or more image characteristics include color and the step of determining similarity includes, for the type of color ($color_1$), determination of color similarity according to a color similarity function $s_c$ ($color_1$, $color_2$), where $color_2$ is any color and so is near a value of 1 when $color_1$ is similar to $color_2$, and $s_c$ is near a value of 0 when $color_1$ is different than $color_2$.

16. The method of claim 15, wherein the step of determining similarity includes determination of color similarity according to:

$$s_c(color_1, color_2) = 1 - \frac{d_c(color_1, color_2)}{maxd_c}$$

where $d_c$ is a color distance function in which $d_c$ is near zero and $s_c$ is near 1 when $color_1$ and $color_2$ are similar, while $d_c$ is large and $s_c$ is near zero when $color_1$ and $color_2$ are dissimilar.

17. The method of claim 1, wherein the weight is the weight of the one or more image characteristics with respect to other image characteristics.

18. The method of claim 17, wherein the step of determining similarity includes determining a composite distance between the image and the search image by combining a plurality of image characteristic distances according to a plurality of weights.

19. A computerized method of managing an image database, comprising the steps of:
constructing an image database by:
storing a plurality of images in an image store; and
storing a plurality of image data representations of the plurality of images;
receiving a specification of one or more image characteristics in a search image, specification of the one or more image characteristics including a type and a location;
querying the image database for images that are similar to the search image by:
identifying from the image data representations one or more images that include the type specified in the search image near the location specified in the search image; and
determining similarity between each image of the one or more images and the search image;
accumulating a set of images determined to be similar to the search image;
ranking the images of the set of images according to a degree of similarity to the search image; and
providing the set of images, in ranked order, from the image store.

20. The method of claim 19 wherein the step of receiving the one or more image characteristic includes receiving a plurality of specifications for a plurality of image characteristics in the search image, each specification including a weight of an image characteristic, and the step of determining similarity includes, for each image characteristic, calculating a composite distance between the image characteristic and a corresponding image characteristic located in an image of the one or more images near a location corresponding to a location specified for the image characteristic, and, for the specified image characteristics, combining composite distances according to weights specified in the search image.

21. The method of claim 20, wherein each image data representation represents a single image.

22. The method of claim 19, wherein the step of receiving a specification includes:
displaying an image query window and moving a representation of the one or more image characteristics into the image query window;
the location of a representation in the window being a specified location.

23. The method of claim 22, wherein the representation is an icon.

24. The method of claim 19, wherein the step of receiving a specification includes outlining areas of the search image, each outlined area specifying the one or more image characteristics according to location.

25. The method of claim 24, wherein the areas are polygonal areas.

26. The method of claim 19, wherein the step of storing a plurality of image data representations includes, for at least one image in the image data base:
partitioning the image into a plurality of partitions; and
storing a data structure for each partition representing a respective image characteristic contained in the partition.

27. The method of claim 26, wherein the step of receiving a specification includes partitioning the search image into partitions and specifying one or more image characteristics in one or more partitions.

28. The method of claim 19, wherein the one or more image characteristics include color and the step of determining similarity includes, for the type of color ($color_1$), determination of color similarity according to a color similarity function $s_c$ ($color_1$, $color_2$), where $color_2$ is any color and $s_c$ is near a value of 1 when $color_1$ is similar to $color_2$, and $s_c$ is near a value of 0 when $color_1$ is different than $color_2$.

29. The method of claim 28, wherein the step of determining similarity includes determination of color similarity according to:

$$s_c(color_1, color_2) = 1 - \frac{d_c(color_1, color_2)}{maxd_c}$$

where $d_c$ is a color distance function in which $d_c$ is near zero oral $s_c$ is near 1 when $color_1$ and $color_2$ are similar, while $d_c$ is large and $s_c$ is near zero when $color_1$ and $color_2$ are dissimilar.

30. The method of claim 19, wherein each weight is the weight of a respective image characteristic with respect to other image characteristics.

31. The method of claim 19, wherein the one or more image characteristics include color.

32. The method of claim 31, wherein the type of the one or more image characteristics is a color.

33. The method of claim 32, wherein the color is defined by a group of color components.

34. The method of claim 33, wherein the group of color components is a group of (RGB) components.

35. The method of claim 31, wherein the one or more image characteristics include texture.

* * * * *